(12) United States Patent
Surace

(10) Patent No.: US 11,603,770 B2
(45) Date of Patent: Mar. 14, 2023

(54) VANE ASSEMBLY WITH INTEGRATED NOZZLE TUBE

(71) Applicant: RAYTHEON TECHNOLOGIES CORPORATION, Farmington, CT (US)

(72) Inventor: Raymond Surace, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 42 days.

(21) Appl. No.: 17/236,014

(22) Filed: Apr. 21, 2021

(65) Prior Publication Data

US 2022/0341334 A1 Oct. 27, 2022

(51) Int. Cl.
*F01D 9/06* (2006.01)
*F01D 5/18* (2006.01)
*F01D 25/12* (2006.01)
*F01D 25/24* (2006.01)
*F01D 5/28* (2006.01)

(52) U.S. Cl.
CPC .............. *F01D 9/065* (2013.01); *F01D 5/187* (2013.01); *F01D 25/12* (2013.01); *F01D 25/246* (2013.01); *F01D 5/284* (2013.01); *F05D 2230/232* (2013.01); *F05D 2260/201* (2013.01); *F05D 2300/6033* (2013.01)

(58) Field of Classification Search
CPC .......... F01D 9/06; F01D 9/065; F01D 25/246; F05D 2240/12; F05D 2230/60
See application file for complete search history.

(56) References Cited

U.S. PATENT DOCUMENTS

| | | | |
|---|---|---|---|
| 5,645,397 A | 7/1997 | Soechting et al. | |
| 6,099,165 A * | 8/2000 | Tremaine | F01D 25/164 |
| | | | 384/535 |
| 6,163,959 A * | 12/2000 | Arraitz | F01D 9/065 |
| | | | 29/889.1 |
| 9,103,219 B2 * | 8/2015 | Beaujard | F01D 9/065 |
| 9,194,241 B2 | 11/2015 | Beaujard et al. | |
| 9,982,600 B2 * | 5/2018 | Socha | F02C 3/06 |
| 10,030,538 B2 | 7/2018 | Hernandez et al. | |

(Continued)

FOREIGN PATENT DOCUMENTS

EP 3597865 1/2020

OTHER PUBLICATIONS

European Search Report for European Patent Application No. 22168808.8 dated Sep. 14, 2022.

*Primary Examiner* — Eldon T Brockman
(74) *Attorney, Agent, or Firm* — Carlson, Gaskey & Olds, P.C.

(57) ABSTRACT

A vane assembly includes an airfoil fairing that has first and second fairing platforms and a hollow airfoil section that extends there between. A spar has a spar leg that extends through the hollow airfoil section. The spar leg has a through-passage and an end portion that protrudes from the second fairing platform. A support is secured with the end portion of the spar leg. The support has a platform that includes first and second sides, an opening that extends between the first and second sides, and a nozzle tube that extends from the second side. The first side is adjacent the second fairing platform. The end portion of the spar leg is disposed in the opening so as to fluidly connect the through-passage with the nozzle tube.

15 Claims, 3 Drawing Sheets

(56) References Cited

U.S. PATENT DOCUMENTS

| | | |
|---|---|---|
| 10,385,710 B2* | 8/2019 | Hendrickson ........... F01D 25/18 |
| 10,415,409 B2 | 9/2019 | Oyarbide |
| 10,577,973 B2* | 3/2020 | Agara ..................... F01D 9/065 |
| 2008/0279679 A1 | 11/2008 | Morrison |
| 2012/0251309 A1* | 10/2012 | Beaujard ............... F01D 25/246 |
| | | 415/178 |
| 2016/0341123 A1* | 11/2016 | Socha ..................... F01D 9/065 |
| 2017/0321572 A1* | 11/2017 | Agara ....................... F02C 7/24 |
| 2018/0223682 A1* | 8/2018 | Hendrickson ............. F02C 7/06 |
| 2018/0230836 A1 | 8/2018 | Tibbott et al. |
| 2020/0248569 A1 | 8/2020 | Whittle et al. |

\* cited by examiner

VANE ASSEMBLY WITH INTEGRATED NOZZLE TUBE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane assembly according to an example of the present disclosure includes an airfoil fairing that has first and second fairing platforms and a hollow airfoil section that extends there between. A spar has a spar leg that extends through the hollow airfoil section. The spar leg has a through-passage and an end portion that protrudes from the second fairing platform. A support is secured with the end portion of the spar leg. The support has a support platform that includes first and second sides and an opening extending between the first and second sides. A nozzle tube extends from the second side. The first side is adjacent the second fairing platform, and the end portion of the spar leg is disposed in the opening so as to fluidly connect the through-passage with the nozzle tube.

In a further embodiment of any of the foregoing embodiments, the nozzle tube is welded to the support platform.

In a further embodiment of any of the foregoing embodiments, the support platform and the nozzle tube are a single, monolithic piece.

A further embodiment of any of the foregoing embodiments includes a seal around the end portion of the spar leg in the opening of the support platform.

A further embodiment of any of the foregoing embodiments includes an annular plenum attached at the second side, the annular plenum including a nozzle opening through which the nozzle tube extends.

In a further embodiment of any of the foregoing embodiments, the annular plenum includes a dynamic seal.

In a further embodiment of any of the foregoing embodiments, the annular plenum is engaged with the support platform via radial spline connections.

In a further embodiment of any of the foregoing embodiments, the airfoil fairing is formed of a ceramic matrix composite.

A further embodiment of any of the foregoing embodiments includes an additional airfoil fairing and an additional spar that has an additional spar leg with an additional through-passage. The support platform has an additional opening and an additional nozzle tube that extends from the second side and an end portion of the additional spar leg is disposed in the additional opening so as to fluidly connect the additional through-passage with the additional nozzle tube.

A gas turbine engine according to an example of the present disclosure includes a compressor section, a combustor in fluid communication with the compressor section, and a turbine section in fluid communication with the combustor. The turbine section has vane assemblies disposed about a central axis of the gas turbine engine. Each of the vane assemblies includes an airfoil fairing that has first and second fairing platforms and a hollow airfoil section that extends there between. A spar has a spar leg that extends through the hollow airfoil section. The spar leg has a through-passage and an end portion that protrudes from the second fairing platform. A support is secured with the end portion of the spar leg. The support has a support platform that includes first and second sides and an opening extending between the first and second sides. A nozzle tube extends from the second side. The first side is adjacent the second fairing platform, and the end portion of the spar leg is disposed in the opening so as to fluidly connect the through-passage with the nozzle tube A further embodiment of any of the foregoing embodiments includes an annular plenum attached at the second side. The annular plenum includes a nozzle opening through which the nozzle tube extends.

In a further embodiment of any of the foregoing embodiments, the annular plenum includes a dynamic seal.

In a further embodiment of any of the foregoing embodiments, the annular plenum is engaged with the support platform via radial spline connections.

In a further embodiment of any of the foregoing embodiments, the nozzle tube is welded to the support platform.

In a further embodiment of any of the foregoing embodiments, the support platform and the nozzle tube are a single, monolithic piece.

A further embodiment of any of the foregoing embodiments includes a seal around the end portion of the spar leg in the opening of the support platform.

In a further embodiment of any of the foregoing embodiments, the airfoil fairing is formed of a ceramic matrix composite.

In a further embodiment of any of the foregoing embodiments, an additional airfoil fairing and an additional spar that has an additional spar leg with an additional through-passage. The support platform has an additional opening and an additional nozzle tube that extends from the second side and an end portion of the additional spar leg is disposed in the additional opening so as to fluidly connect the additional through-passage with the additional nozzle tube.

A method of assembling a vane assembly according to an example of the present disclosure include providing the airfoil fairing, the spar, and the nozzle tube. The spar leg is inserted through the hollow airfoil section such that an end portion of the spar leg protrudes from the second fairing platform. The end portion of the spar leg is inserted into the opening of the support platform such that the first side of the support platform is adjacent to the second fairing platform. The end portion of the spar leg is secured with the support platform.

A further embodiment of any of the foregoing embodiments includes attaching an annular plenum at the second side, the annular plenum including a nozzle opening through which the nozzle tube extends.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
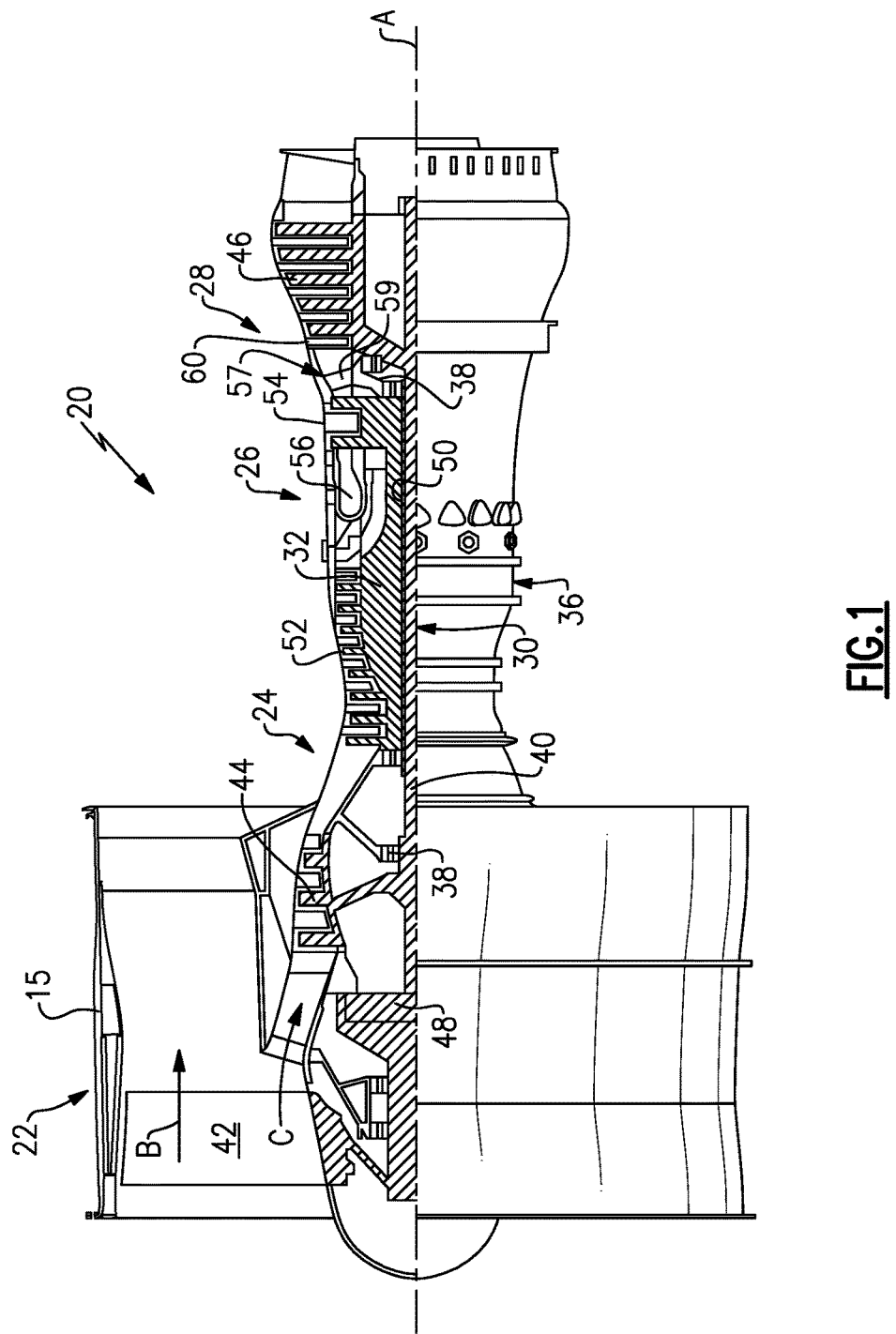
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
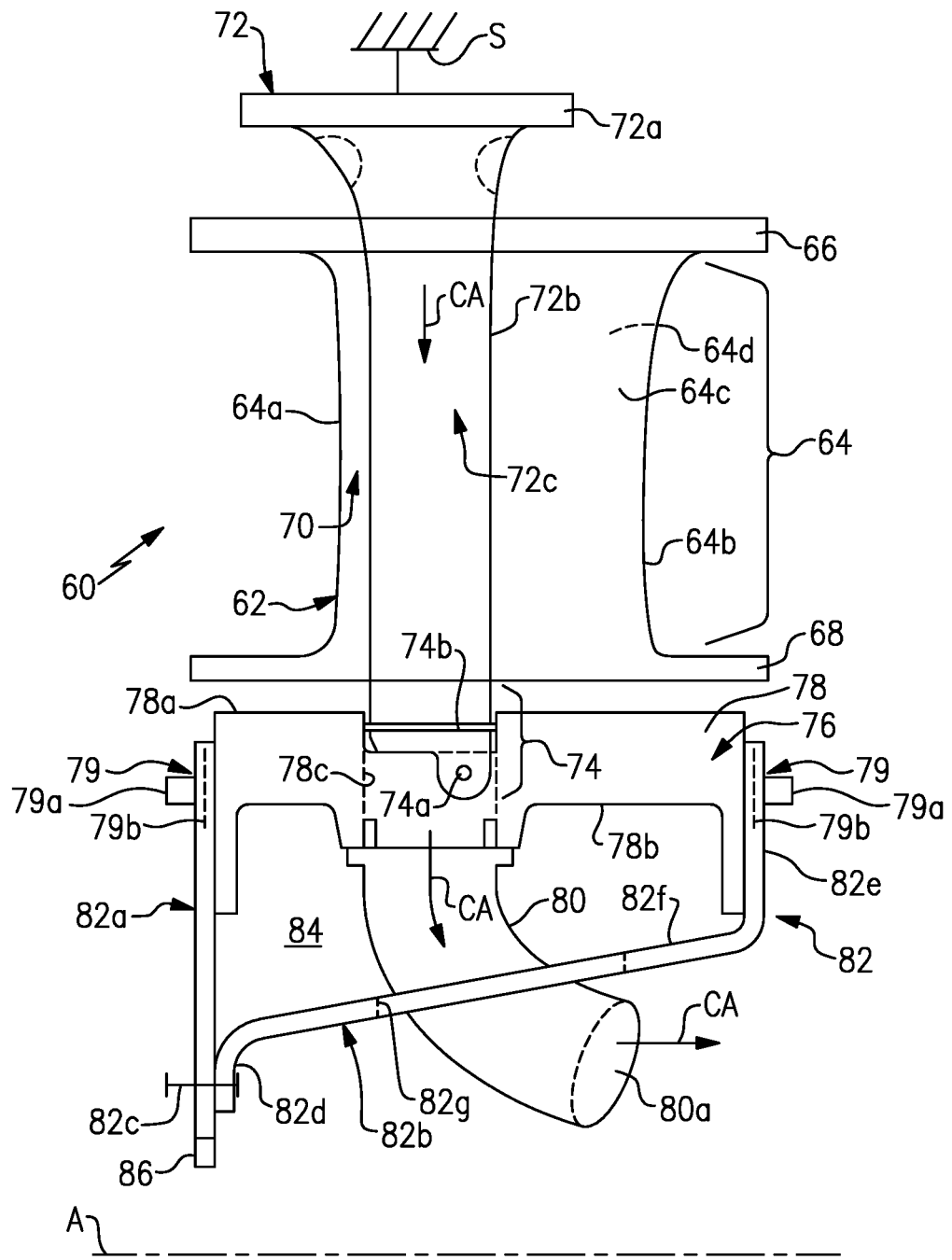
FIG. 2 illustrates a vane assembly of the engine.

FIG. 2 illustrates a line representation of an example of a vane assembly 60 in the turbine section 28 of the engine 20 (see also FIG. 1). A plurality of the vane assemblies 60 are arranged to form a circumferential vane row around the central engine axis A. It is to be understood that although the examples herein are discussed in context of a vane assembly from the turbine section 28, the examples can be applied to vanes assemblies in other sections of the engine.

The vane assemblies 60 each include an airfoil fairing 62 that is comprised of an airfoil section 64 and first and second platforms 66/68 between which the airfoil section 64 extends. In this example, the first platform 66 is an outer platform and the second platform 68 is an inner platform. The terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

The airfoil section 64 generally extends in a radial direction relative to the central engine axis A and defines leading and trailing edges 64a/64b, a suction side 64c, and a pressure side 64d. The airfoil section 64 is hollow and circumscribes an interior through-cavity 70. The airfoil section 64 may have a single through-cavity 70, or the cavity 70 may be sub-divided by one or more ribs into forward and aft sub-cavities.

The airfoil fairing 62 is a continuous, one-piece body. As an example, the airfoil fairing 62 is formed of a ceramic matrix composite (CMC), or a metal matrix composite (MMC). In one example, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example metal matrix composites include, but are not limited to, boron carbide fiber tows and/or alumina fiber tows disposed in a metal matrix, such as aluminum. The fiber tows are arranged in a fiber architecture, which refers to an ordered arrangement of the tows relative to one another, such as a 2D woven ply (e.g. a braid) or a 3D structure.

The vane assembly 60 further includes a spar 72 that mechanically supports the airfoil fairing 62. The spar 72 may be formed of a relatively high temperature resistance, high strength material, such as nickel or cobalt superalloy (e.g., a single crystal nickel-alloy). The spar 72 includes a spar flange 72a and a spar leg 72b that extends from the spar flange 72a into the through-cavity 70 (e.g., the forward sub-cavity). The spar leg 72b defines an interior through-passage 72c that has an inlet through the spar flange 72a or at the sides of the spar flange 72a (shown in dashed lines) to receive cooling air and an outlet at an end portion 74 of the spar leg. The spar flange 72a is secured at an outer end to support hardware S. The end portion 74 of the spar leg 72b protrudes from the airfoil fairing 62 at the second platform 68. The end portion 74 of the spar leg 72b is secured to a support 76 that is adjacent to the platform 68 of the airfoil fairing 62. For example, the end portion 74 is secured to the support 76 by a pin 74a, although it is to be understood that the end portion 74 may additionally or alternatively be secured via other mechanisms, such as but not limited to, fasteners and weldments. The airfoil fairing 62 is trapped between the support 76 and the spar flange 72a, or between the support 76 and an intermediate support between the platform 66 and the spar flange 72a. Aerodynamic load and/or a spring load may drive the airfoil fairing 62 radially inwardly toward the support 76.

The support 76 includes a support platform 78 that defines first and second opposed sides 78a/78b and at least one opening 78c that extends between the sides 78a/78b. The first side 78a is adjacent to the platform 68 of the airfoil fairing 62. The support 76 further includes a nozzle tube 80 that extends from the second side 78b of the platform 78 such that the opening 78c and the nozzle tube 80 form a continuous passage. The end portion 74 of the spar leg 72b is disposed in the opening 78c so as to fluidly connect the through-passage 72c with the nozzle tube 80. A seal 74b may be provided around the end portion of the spar leg 72b in the opening 78c to seal the connection.

During operation of the engine 20, cooling air CA, such as bleed air from the compressor section 24, is provided into the through-passage 72c of the spar leg 72b. The spar leg 72b conveys the cooling air CA to the support 76, where the cooling air CA travels through the opening 78c to the nozzle tube 80. As shown, the nozzle tube 80 is curved such that an outlet 80a of the nozzle tube 80 is generally aimed in a circumferential direction. The cooling air CA is discharged from the outlet 80a of the nozzle tube 80 as a tangential cooling stream. This tangential cooling stream may be utilized for cooling of adjacent rotating turbine components.

The cooling air CA travels through numerous components from the compressor section 24 to the outlet 80a of the nozzle tube 80. Interfaces between the components provide potential leak paths for the cooling air, which may reduce engine efficiency and cooling efficiency. Seals may be used to seal such interfaces, however, to the extent that such interfaces can be eliminated the seals at those locations can also be eliminated and thereby facilitate reductions in leakage. In this regard, as discussed below, the support 76 is an integration of several functional components that eliminates a potential interface and seal to thereby facilitate a reduction in leakage.

The support 76 is a one-piece structure in which the platform 78 and the nozzle tube 80 are integral so as to be inseparable without physical destruction. The platform 78 and the nozzle tube 80 may be integrated during fabrication of the support 76. In one example, the support 76 is cast such that the platform 78 and the nozzle tube 80 are a single, monolithic piece that does not have a mechanical joint. In another example, the platform 78 and the nozzle tube 80 are initially separate pieces that are then permanently joined by welding. In either case, the integration of the platform 78 and the nozzle tube 80 as one piece eliminates the need for a mechanical joint and seal there between, which in turn eliminates air leaks between the platform 78 and the nozzle tube 80.

In the illustrated example, the vane assembly 60 further includes an annular plenum 82 that encases the second side 78b of the platform 78 and partially encases the nozzle tube 80. The annular plenum 82 includes a backing ring 82a and a cover plate ring 82b that are concentric with the central engine axis A. The backing ring 82a is a radially-extending wall, the outer section of which engages the platform 78 and the inner section of which is secured to the cover plate ring 82b by a fastener 82c. The inner section of the backing ring 82a may include a dynamic seal 86, such as an abradable element (e.g., a porous body or honeycomb), that seals with a rotating seal element of an adjacent rotor. The backing ring 82a and the cover plate ring 82b are engaged with the platform 78 via radial spline connections 79. Each radial spline connection 79 includes a pin 79a that protrudes from the platform 78 and engages a radial slot 79b in the backing ring 82a or the cover plate ring 82b. Such connections provide radial play between the plenum 82 and platform 78 as the pins 79a slide radially in the slots 79b to accommodate thermal expansion and contraction in the radial direction.

The cover plate ring 82b in this example includes an inner radial wall section 82d that is secured to the backing ring 82a, an outer radial wall section 82e that engages the platform 78, and conical intermediate wall section 82f that joins sections 82d/82e. Together the backing ring 82a and the cover plate ring 82b enclose a plenum region 84 along the second side 78b of the platform 78. The nozzle tube 80 extends through the plenum region 84 and through an opening 82g in the conical intermediate wall section 82f of the cover plate ring 82b. The plenum 82 and plenum region 84 serve to insulate the second side 78b of the platform 78 and a portion of the nozzle tube 80 and thereby facilitate insulating the cooling air from picking up heat as it is conveyed from the spar leg 72b through the support 76 before discharge from the outlet 80a of the nozzle tube 80.

Figure 3:
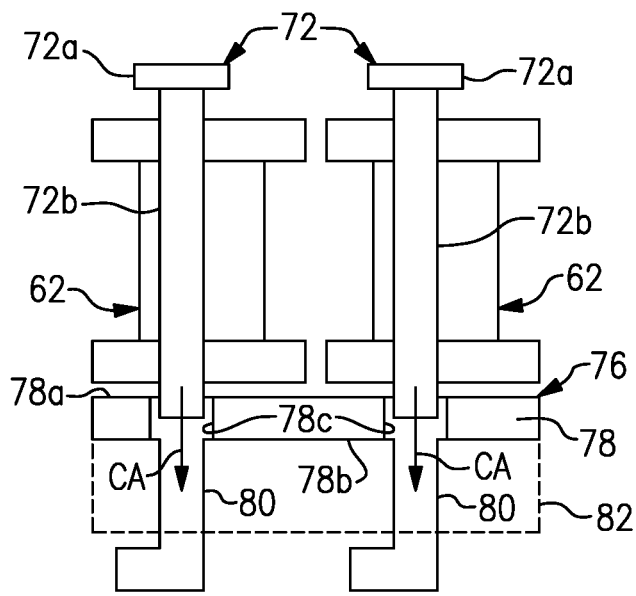
FIG. 3 illustrates a support of a vane assembly that has a multiplet configuration.

The supports 76 of the vane assemblies 60 of the circumferential vane row arranged around the central engine axis A may be configured as singlets or multiplets. In a singlet configuration, for each support 76 there is a set of one airfoil fairing 62 and one spar 72 connected with the support 76. In a multiplet configuration, for each support 76 there are multiple sets of airfoil fairings and spars 72 connected to the support 76. The multiplet configuration thus reduces the number of pieces and also eliminates an interface and seal between adjacent supports 76. FIG. 2 represents the singlet configuration. FIG. 3 shows an example of a multiplet configuration. In this example, there are two nozzle tubes 80 that extend from the second side 78b of the platform 78. The platform 78 and nozzle tubes 80 are a one-piece structure, as discussed above. It is to be appreciated that although this example shows two nozzle tubes 80 (i.e., a doublet), further example configurations could include three (triplet), four (quadlet), or more nozzle tubes 80.

Figure 4:
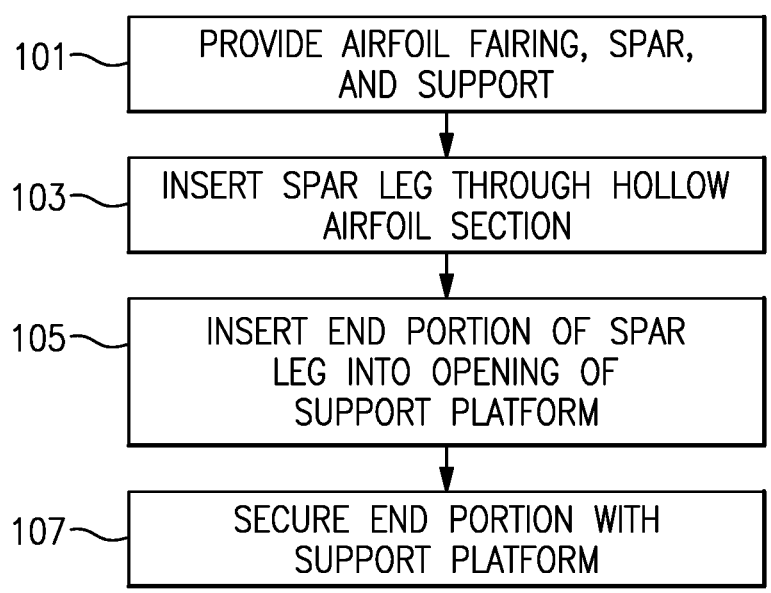
FIG. 4 illustrates a flowchart for a method of assembly.

The examples above also represent a method of assembling the airfoil assembly 60, which is also shown by flowchart in FIG. 4. For example, at 101 the method includes providing the airfoil fairing 62, spar 72, and support 78. For example, these components are provided as pre-fabricated articles for assembly. At 103 the method includes inserting the spar leg 72b through the hollow airfoil section 64 such that the end portion 74 of the spar leg 72b protrudes from the second fairing platform 68. The insertion generally involves aligning the spar leg 72b with the cavity 70 of the airfoil section 64 and then moving the spar leg 72b into and through the cavity 70. This insertion may be conducted manually, but automated insertion may also be used. Next, at 105 the end portion 74 of the spar leg 72b is inserted into the opening 78c of the support platform 78 such that the first side 78a of the support platform 78 is adjacent to the second fairing platform 68. Again, this may be conducted manually or by automation. At 107 the end portion 74 of the spar leg 72b is then secured to the support. For example, the securing may include inserting the aforementioned pin 74a through the end portion 74 of the spar leg 72b, or welding or using fasteners to secure the end portion 74 to the support 76. The above assembly method may be utilized as an original manufacturing of the vane assembly 60 or as part of a repair, maintenance, or inspection process after original manufacturing.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane assembly comprising:
   an airfoil fairing having first and second fairing platforms and a hollow airfoil section extending there between;
   a spar having a spar leg that extends through the hollow airfoil section, the spar leg having a through-passage and an end portion that protrudes from the second fairing platform;
   a support secured with the end portion of the spar leg, the support having a support platform including first and second sides and an opening extending between the first and second sides, and a nozzle tube extending from the second side, the first side being adjacent the second fairing platform, and the end portion of the spar leg being disposed in the opening so as to fluidly connect the through-passage with the nozzle tube; and
   an annular plenum attached at the second side, the annular plenum including a nozzle opening through which the nozzle tube extends, the annular plenum being engaged with the support platform via radial spline connections.

2. The vane assembly as recited in claim 1, wherein the nozzle tube is welded to the support platform.

3. The vane assembly as recited in claim 1, wherein the support platform and the nozzle tube are a single, monolithic piece.

4. The vane assembly as recited in claim 1, further comprising a seal around the end portion of the spar leg in the opening of the support platform.

5. The vane assembly as recited in claim 1, wherein the annular plenum includes a dynamic seal.

6. The vane assembly as recited in claim 1, wherein the airfoil fairing is formed of a ceramic matrix composite.

7. The vane assembly as recited in claim 1, further comprising an additional airfoil fairing and an additional spar that has an additional spar leg with an additional through-passage, wherein the support platform has an additional opening and an additional nozzle tube that extends from the second side and an end portion of the additional spar leg is disposed in the additional opening so as to fluidly connect the additional through-passage with the additional nozzle tube.

8. A gas turbine engine comprising:
   a compressor section;
   a combustor in fluid communication with the compressor section; and
   a turbine section in fluid communication with the combustor, the turbine section having vane assemblies disposed about a central axis of the gas turbine engine, each of the vane assemblies includes:
     an airfoil fairing having first and second fairing platforms and a hollow airfoil section extending there between,
     a spar having a spar leg that extends through the hollow airfoil section, the spar leg having an internal through-passage and an end portion that protrudes from the second fairing platform,
     a support secured with the end portion of the spar leg, the support having a support platform including first and second sides and an opening extending between the first and second sides, and a nozzle tube extending from the second side, the first side being adjacent the second fairing platform, and the end portion of the spar leg being disposed in the opening so as to fluidly connect the through-passage with the nozzle tube, and an annular plenum attached at the second side, the annular plenum including a nozzle opening through which the nozzle tube extends, the annular plenum being engaged with the support platform via radial spline connections.

9. The gas turbine engine as recited in claim 8, wherein the annular plenum includes a dynamic seal.

10. The gas turbine engine as recited in claim 8, wherein the nozzle tube is welded to the support platform.

11. The gas turbine engine as recited in claim 8, wherein the support platform and the nozzle tube are a single, monolithic piece.

12. The gas turbine engine as recited in claim 8, further comprising a seal around the end portion of the spar leg in the opening of the support platform.

13. The gas turbine engine as recited in claim 8, wherein the airfoil fairing is formed of a ceramic matrix composite.

14. The gas turbine engine as recited in claim 8, further comprising an additional airfoil fairing and an additional spar that has an additional spar leg with an additional through-passage, wherein the support platform has an additional opening and an additional nozzle tube that extends from the second side and an end portion of the additional spar leg is disposed in the additional opening so as to fluidly connect the additional through-passage with the additional nozzle tube.

15. A method of assembling a vane assembly, the method comprising:

providing an airfoil fairing that has first and second fairing platforms and a hollow airfoil section that extends there between, a spar that has a spar leg that includes an internal through-passage, and a support that has a support platform that includes first and second sides, an opening that extends between the first and second sides, and a nozzle tube that extends from the second side;

inserting the spar leg through the hollow airfoil section such that an end portion of the spar leg protrudes from the second fairing platform;

inserting the end portion of the spar leg into the opening of the support platform such that the first side of the support platform is adjacent to the second fairing platform;

securing the end portion of the spar leg with the support platform, the through-passage of the spar leg being fluidly connected with the nozzle tube; and attaching an annular plenum at the second side, the annular plenum including a nozzle opening through which the nozzle tube extends, the annular plenum engaging with the support platform via radial spline connections.

* * * * *